D. G. STAFFORD.
Grates.

No.155,844. Patented Oct. 13, 1874.

Witnesses
N B Smith
C M Smith

Inventor
David G. Stafford

UNITED STATES PATENT OFFICE.

DAVID G. STAFFORD, OF SYRACUSE, NEW YORK, ASSIGNOR TO JAMES S. LEACH, OF SAME PLACE.

IMPROVEMENT IN GRATES.

Specification forming part of Letters Patent No. 155,844, dated October 13, 1874; application filed December 27, 1873.

*To all whom it may concern:*

Be it known that I, DAVID G. STAFFORD, of the city of Syracuse, in the county of Onondaga and State of New York, have invented a new and Improved Ash-Pit and Grate for Stoves and Furnaces; and I do hereby declare that the following is a full, clear, and exact description of the same, reference being had to the annexed drawing, which forms part of this specification, in which—

Figure 1:
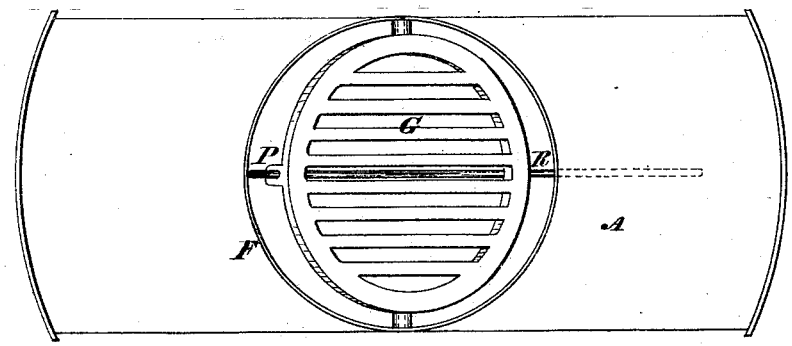
Figure 2:
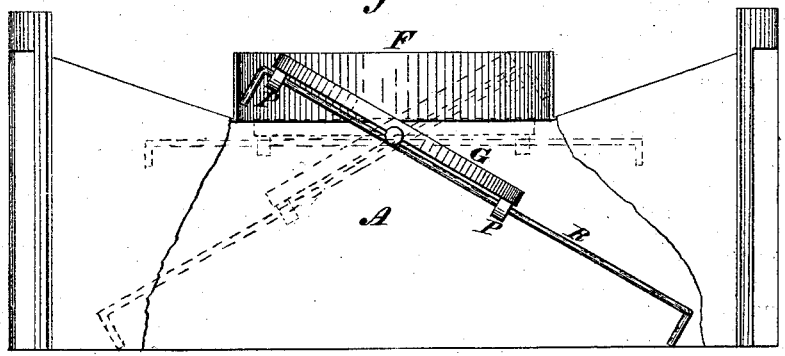

Figure 1 represents a top view of the grate and ash-pit, and Fig. 2 represents a sectional view thereof.

The letters of reference used represent corresponding parts wherever they occur.

The ash-pit and grate are so arranged that the grate can be dumped in opposite directions, whereby the ashes, cinders, and clinker can be more readily removed from the bottom of the fire-chamber.

The ash-pit A is intended to form an open chamber extending from side to side of the stove or furnace, and the fire-pot will rest upon the top of it. At the bottom of the fire-pot F is an ordinary grate, G, hinged transversely to the chamber of the ash-pit, so that it may be turned down to either end of the ash-pit. To provide for thus turning down the grate G, I make the sliding rod R, and locate it to run through eyes or slots P P at the bottom of the grate, and with a hook or stop at each end, to prevent it from dropping out.

This rod should be pushed or drawn toward the end of the ash-pit where the dumping is to take place; and when the clinker and cinders are brought down on that side the grate may, in like manner, be dumped at the other end of the ash-pit by extending the rod so that the short end will allow the grate to turn.

In this way nearly, if not quite, all of the ashes, cinders, and clinker can be removed without the whole contents of the fire-chamber being precipitated into the ash-pit.

What I claim as my invention, and desire to secure by Letters Patent of the United States, is—

The ash-pit A, constructed to open on two opposite sides, the grate G with the eyes P P, and the sliding rod R, combined and operated to dump the grate both ways, substantially as described.

DAVID G. STAFFORD.

Witnesses:
N. B. SMITH,
C. W. SMITH.